Oct. 25, 1966  R. J. PURTELL  3,281,081
IRRIGATION SYSTEM
Filed Feb. 26, 1964  6 Sheets-Sheet 3

RUFUS J. PURTELL
INVENTOR.

BY C. W. Coffee
Atty.

Oct. 25, 1966 R. J. PURTELL 3,281,081
IRRIGATION SYSTEM

Filed Feb. 26, 1964 6 Sheets-Sheet 4

RUFUS J. PURTELL
INVENTOR.

BY C. W. Coffee
Atty.

Oct. 25, 1966   R. J. PURTELL   3,281,081
IRRIGATION SYSTEM

Filed Feb. 26, 1964   6 Sheets-Sheet 5

RUFUS J. PURTELL
INVENTOR.

BY *C.W.Offee*
Atty.

United States Patent Office 3,281,081
Patented Oct. 25, 1966

3,281,081
IRRIGATION SYSTEM
Rufus J. Purtell, Brownfield, Tex., assignor, by mesne assignments, to The J. B. Knight Co., Inc., Brownfield, Tex., a corporation of Texas
Filed Feb. 26, 1964, Ser. No. 347,618
7 Claims. (Cl. 239—213)

This invention relates to agricultural irrigation and more particularly to a system for moving sprinkler pipe.

This application is co-pending with my prior patent application, Serial No. 236,474, filed on November 5, 1962, now Patent No. 3,157,193, which was a continuation-in-part of application Serial No. 153,628, filed on November 20, 1961, and now abandoned, which itself was co-pending with my application which matured into Patent No. 3,009,646, which issued on November 21, 1961.

In the irrigation of agricultural fields it is often desirable to have a main lateral line with a plurality of trail tubes extending at right angles from the main lateral line. In this manner, more land can be watered at any one time and therefore, the application rate of the water is slower so that the water soaks in better. Also, with this arrangement, it is not necessary to move the pipe so frequently. As shown by my previous applications, however, there have been problems encountered in dragging the trail tubes behind a power moved lateral pipe if the lateral pipe itself is raised and lowered.

I have improved upon my previous systems by attaching at least a portion of the trail tubes, directly onto the moving vehicle so that the trail tubes themselves are neither raised or lowered. The water connection is made to the lateral pipe by a flexible rubber hose.

Furthermore, it is often desirable to move the system parallel to the longitudinal extent of the lateral pipe rather than transverse to the pipe. Therefore, I have provided means to use two of the wheels that are present on either end of the vehicles of the system to move longitudinally of the pipe. It is necessary to reposition these two wheels for such a move.

To combat the accumulation of mud on the main driving wheel, I have found it desirable to change this main driving wheel to a smooth idler wheel. A mud scraper is run against the wheel to scrape mud therefrom. The chain which runs around the idler wheel has lugs thereon so that the lugs of the chain are actually the elements which convey the vehicle forward.

Further, although the system in general will maintain alignment, occasionally one wheel will become misaligned. Therefore, it has been found desirable to provide a convenient clutch arrangement so that the drive mechanism may be manually disconnected and the wheel brought into alignment. A crank is provided more particularly for this purpose.

Still further, my previous system utilized a system of brakes with dogs to prevent movement of the vehicle while the pipe was being raised and lowered. I have simplified this system by utilizing a spike or spade which strikes into the ground to prevent the movement of the vehicle. The balance of the vehicle is utilized to pull the spade from the ground when it is desired to move forward.

Springs are utilized to aid in the raising of the pipe, therefore reducing the force necessary to raise the pipe, making the force tending to move the vehicle forward smaller.

An object of this invention is to provide an agricultural irrigation pipe moving system with the features and advantages pointed out above.

Further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not necessarily to the same scale, in which:

Figures 1, 2:
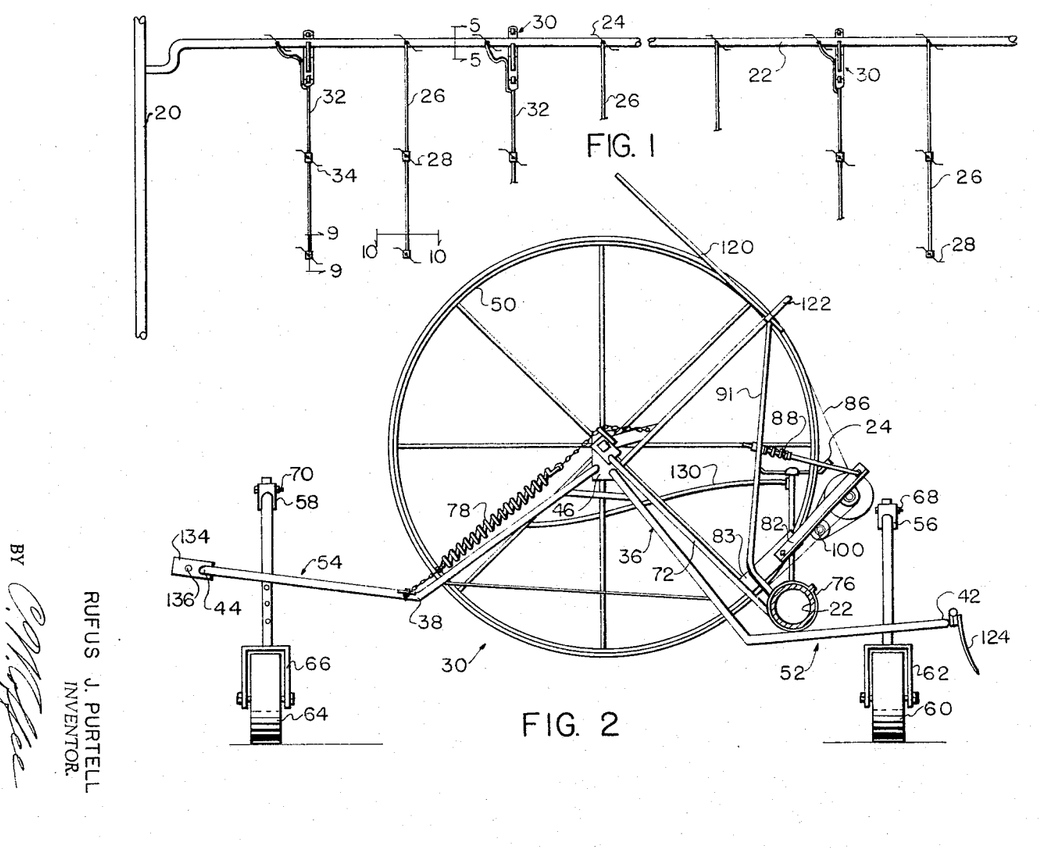
FIG. 1 is a plan view of the system with parts broken away showing the general arrangement of the pipes and vehicles.
FIG. 2 is a side elevation of one vehicle with the wheels in position for moving longitudinally of the lateral pipe.

As may be seen, particularly in FIG. 1, the system basically includes a main supply pipe 20 which transfers water under pressure to lateral pipe 22. The main supply pipe 20 is a source of water under pressure to the lateral pipe 22. The source of water to the pipe 20 is provided by some source not shown. The lateral pipe 22 has a plurality of sprinklers 24 located thereon. In addition, the lateral pipe 22 has directly connected thereto a plurality of trail tubes 26, each of which has one or more sprinklers 28 on it. The lateral pipe 22 is movable across the field to be irrigated by a plurality of attached vehicles 30. Attached to each vehicle 30 is a trail tube 32, each trail tube 32 having one or more sprinklers 34.

Each of the vehicles 30 has a body which includes a frame 36 and arms 72 with elements attached thereto. The frame 36 is constructed of bent pipe. It has two longitudinal side elements, right side element 38 and left side element 40. These elements are connected at the forward portion of the frame 36 by front bight 42 and on the rear portion by rear bight 44.

Ear 46 extends upward from each side element 38 and 40 about halfway between the forward bight 42 and rear bight 44 (FIGS. 2, 3, 4, and 6). Axle 48 extends between the two ears 46. Large central wheel 50 is journalled for rotation about the axle 48. Thus, the wheel 50 is on the body of the vehicle 30. The frame 36 has a portion 52 which extends forward of the large wheel 50. Likewise the frame has a rear portion 54 which extends rearwardly of the large wheel 50. Front vertical tube 56 is attached to the forward portion 52 of the frame 36. Rear vertical tube 58 is attached to the rear portion 54 of the frame 36. Front wheel 60 is journalled for rotation within front fork 62. The top of the front fork 62 is telescoped within the front vertical tube 56.

Figures 3, 8:
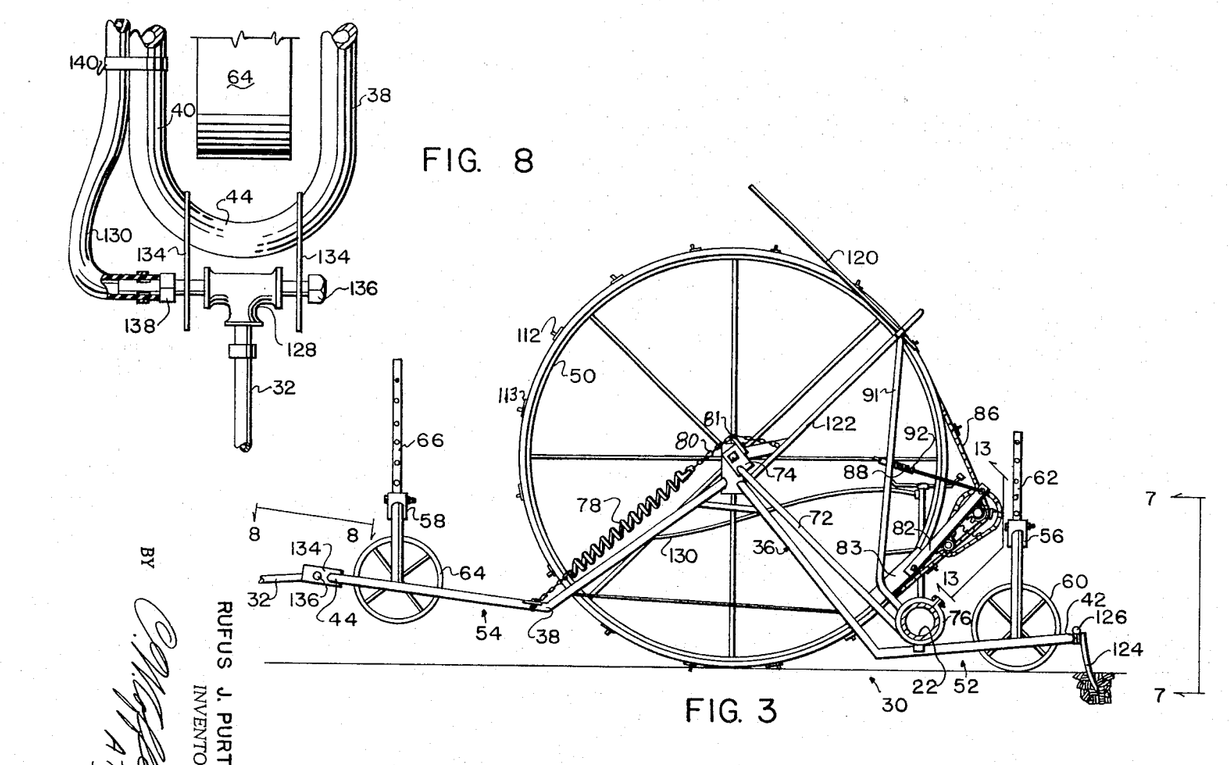
FIG. 3 is a side elevation of one vehicle with the lateral pipe in watering position with parts broken.
FIG. 8 is a partial plan view with parts broken away showing the attachment of some of the trail tubes to the vehicle taken on line 8—8 of FIG. 3.
Figures 4, 11:
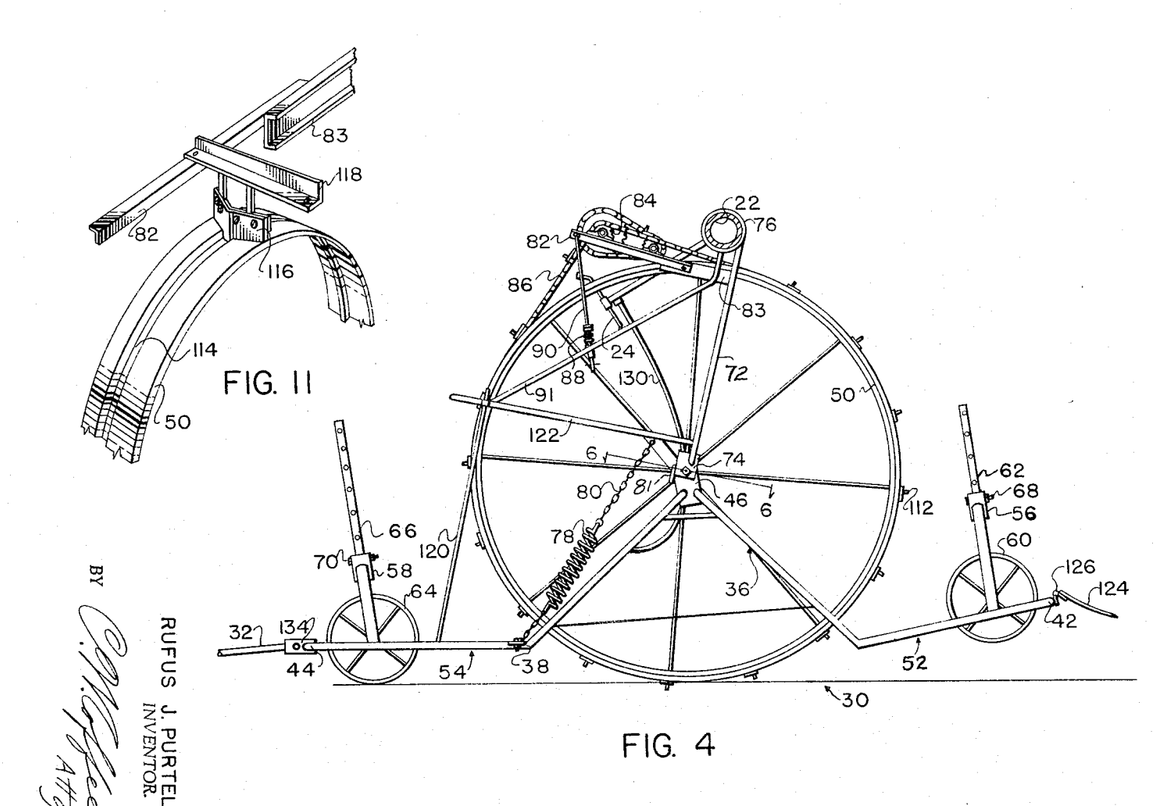
FIG. 4 is a side elevational view of one vehicle with the pipe in the raised moving position with parts broken.
FIG. 11 is a perspective view showing the mud scraper on main wheel with many of the parts eliminated and others broken away for clarity.

Likewise, rear wheel 64 is journalled for rotation within rear fork 66 and the upper portion of the rear fork 66 is telescoped within rear vertical tube 58. The front wheel 60 may be held in either of two positions by pin 68 which extends through a hole in the tube 56 and the fork 62. In one position (FIGS. 3 and 4), the wheel 60 is raised and the axle of the front wheel 60 is parallel to the axle 48 of the large wheel 50. In the other position (FIG. 2), the wheel 60 is far lower with respect to the frame 36 and the axle is transverse to the axle 48 of the large wheel 50. Likewise, the rear wheel 64 may be maintained in either of two positions by pin 70 which extends through the tube 58 and the fork 66. When the wheel 64 is in a raised position, its axle is parallel to the axle 48 of the main wheel 50, but when the rear wheel 64 is in the lower position, the axle is transverse to the axle 48 of the main wheel 50. The frame 36 is so proportioned that if both of the wheels 60 and 64 are in the raised position, that the large wheel 50 and only one of the wheels 60 or 64 are in contact with the earth at one time (FIGS. 3 and 4). However, if the wheels 60 and 64 are in the lower position, the frame is raised so that the large wheel 50 is suspended above the earth (FIG. 2). Therefore, it may be seen that in normal movement with the large wheel 50 contacting the ground, that one or the other of the front or rear wheels 60 or 64 will be also contacting the ground and that the wheels will all be mounted so that they roll in the same direction. However, if it is desired to move the vehicle 30 and pipe 22 longitudinally, the wheels 60 and 64 may be lowered, raising the large wheel 50 off the ground and then the small front wheel 60 and rear wheel 64 will roll the pipe 22 axially along the ground and they will roll at right angles to the large wheel 50. The trail tubes 32 and 26 are disconnected for such move.

Arms 72 are pivoted about the axle 48 by tabs 74 on the arms. The length of the arms 72 is greater than the radius of the large wheel 50; therefore, the arms 72 extend beyond the rim of the wheel 50. The ends of the arms 72 are connected by pipe clamp 76 within which is clamped the lateral pipe 22. The pipe clamp 76 holds the pipe 22 parallel to the axle 48. The front portion 52 of the frame 36 is bent downward so that when watering it is only slightly above the ground level (FIG. 3). Therefore, when the arms 72 are in the down position, the pipe 22 is suspended slightly above the ground at each vehicle 30, as is desirable. Spring 78 on each side of the vehicle 30 extends from one of the side elements 38 and 40 at the rear portion 54 to chain 80 which is attached to one of arms 72. The tension of the spring 78 tends to lift the pipe 22. The chain 80 extends over fork 81 on the tab 74. When the pipe clamp 76 is resting against the forward portion 52 of the frame 36, the spring 78 has a better leverage on the arm 72. The tension in the spring 78 is adjusted so that it approximately balances the weight of the pipe 22 when the pipe is empty of water.

Figure 5:
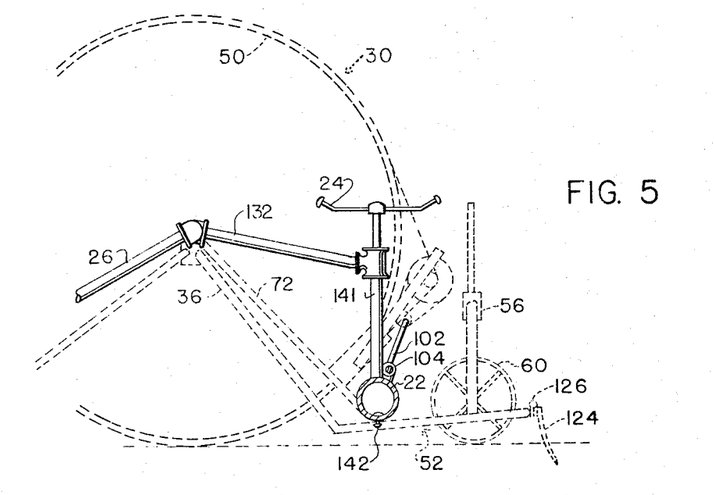
FIG. 5 is a sectional view, with the vehicle schematically shown in broken lines showing the connection of a part of the trail tubes taken on line 5—5 of FIG. 1 with parts broken.
Figure 6:
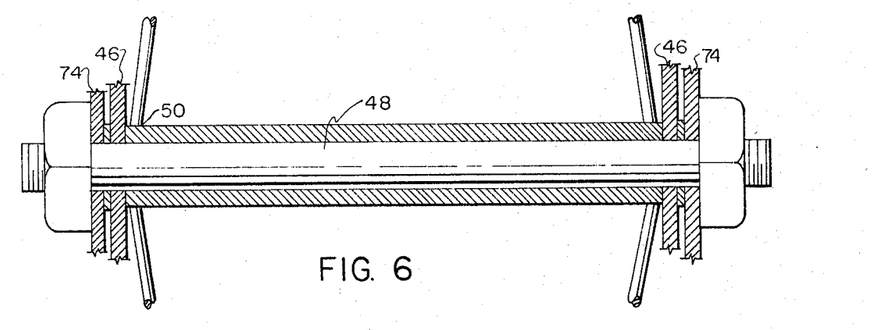
FIG. 6 is a sectional view through the axle of one vehicle showing the three elements which rotate separately, taken on line 6—6 of FIG. 4.
Figure 7:
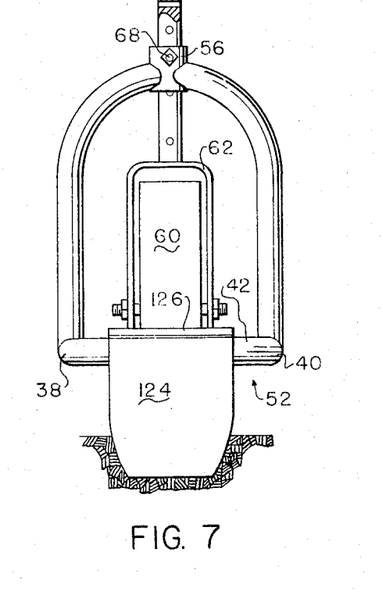
FIG. 7 is a front view of the spade with parts broken away taken on line 7—7 of FIG. 3.
Figure 12:
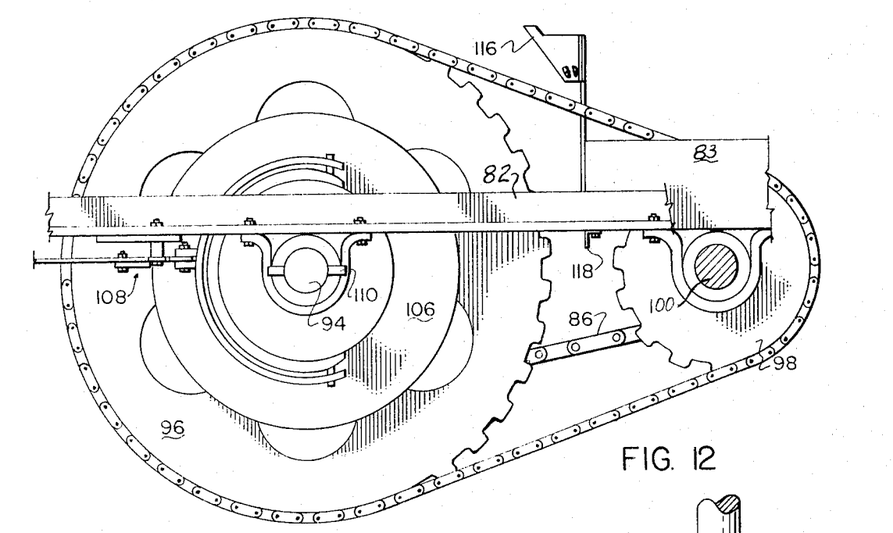
FIG. 12 is an elevational view with parts broken away showing an enlargement from the opposite side of a part of FIG. 3.
Figure 13:
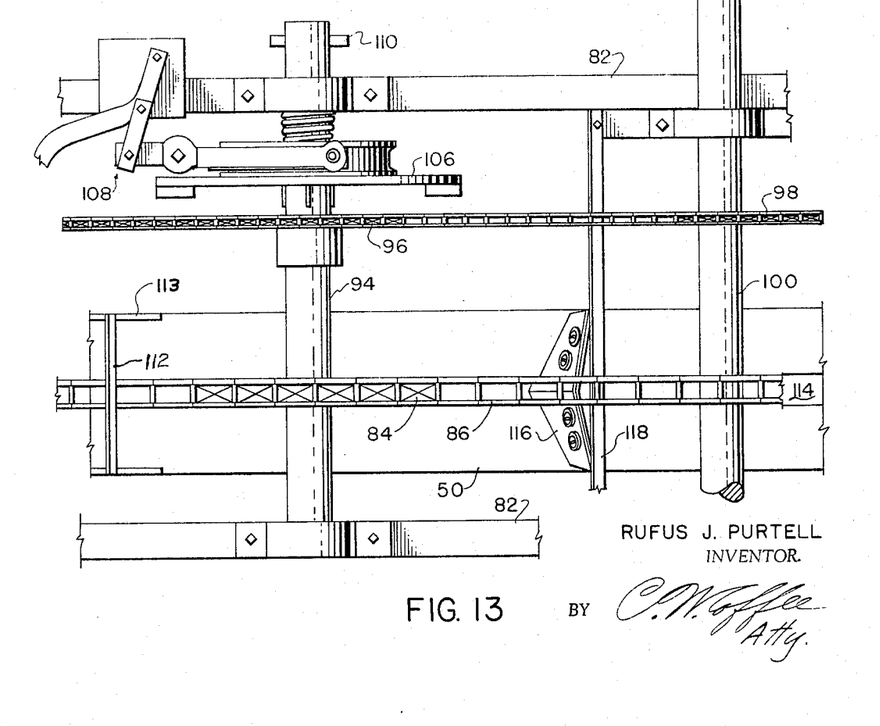
FIG. 13 is a partial detail of some of the drive mechanism taken on line 13—13 of FIG. 3.

Bearing mount 82 is pivoted to extension 83 of the arms 72. The extensions 83 are attached to the arms 72 at a distance equal to the radius of the wheel 50. Sprocket 84 is journalled on the bearing mount 82 with its axis parallel to the axle 48. The sprocket 84 is engaged with chain 86 which encircles the large wheel 50. The sprocket 84 is held in engagement against the chain 86 by the pressure of helical compression springs 88 which encircle rod 90. The rod 90 has one end pivoted in the bearing mount 82 and the other end telescoped through a hole in brace 91. An assembly of rod 90 and spring 88 is attached on each side. The spring 88 is in compression between stop 92 upon the rod 90 and the brace 91. The sprocket 84 is mounted upon shaft 94 (FIGS. 12 and 13). Driven sprocket 96 is mounted for rotation upon the shaft 94. It is driven by a chain which is also trained over drive sprocket 98. The drive sprocket 98 is mounted upon stub shaft 100. The stub shaft 100 is journalled for rotation upon the bearing mount 82. Either end of the stub shaft 100 has a square section so that the square ends of the line shaft 102 are adapted to telescope over it. Line shaft 102 extends the length of the system and has intermediate bearings 104 attached to the pipe 22 to support it between vehicles 30 (FIG. 5). Clutch plate 106 is splined to shaft 94. Plate 106 has projections which engage holes within the side of the driven sprocket 96. The clutch plate is moved into engagement with the driven sprocket 96 by clutch operator 108 which is manually controlled. Therefore, it may be seen that if the clutch plate 106 is engaged with the driven sprocket 96, that rotation of the line shaft 102 will rotate the shaft 94 through the clutch, thus causing movement between the clamp 76 upon the arms 72 and the chain 86. If the clutch plate 106 is disengaged from the driven sprocket 96, the shaft 94 will be free to rotate and also the rotation of the stub shaft 100 will not cause rotation of the shaft 94. Shaft 94 has pinned projection 110 so that a crank may be engaged thereon to move any vehicle independent of rotation of the line shaft 102.

The chain 86 has lugs 112 attached thereto. The lugs 112 are the width of the large wheel 50. The lugs 112 project outward from the wheel 50 to act as cleats to engage the ground and prevent slipping. Each lug 112 has two arcuate metal shoes 113 attached thereto on either side of the chain 86 parallel to the chain. The width of the chain 86 is about one-fifth of the width of the wheel 50. These shoes 113 have the same radius of curvature as the rim of wheel 50 and fit snugly against the wheel 50 when they are contacting the ground. Among other things, the shoes 113 prevent the lugs 112 from bending the chain 86 because of their contact with the wheel. The large wheel 50 has a circumferential groove 114 in its rim (FIGS. 11 and 13). Chain 86 fits within this groove. Other than this groove 114, the rim of the wheel 50 is smooth. Therefore, mud scraper 116 mounted upon the bearing mount 82 meets no obstruction and is able to scrape all the mud from the wheel 50. The mud scraper 116 is made of pliable flexible material. I have found belting to be suitable for this, I have arranged it in V shape and angled it toward the wheel 50 to efficiently scrape the mud therefrom. It has a contour to fit the contour of the rim. Namely, the mud scraper 116 has a projection to fit into the groove 114. It is mounted upon a cross member 118 extending from one side of the bearing mount 82 to the other.

As viewed in FIG. 3, clockwise rotation of the arms 72 is limited by the contact of the pipe clamp 76 with the forward portion 52 of the frame. Counterclockwise rotation is limited by stop 120 which is adjustably attached to loop 122. The loop 122 extends around the wheel 50 and is attached on either end to the arm 72 near the tabs 74. The brace 91 extends from the loop 122 to the arm extension 83. The stop 120 is adjusted to contact the rear portion 54 of the frame so that the counterclockwise movement of the arms 72 is stopped at about that point when the weight of the pipe 22 and the shaft 102 and other equipment attached to the arms 72 is slightly past dead center on the large wheel 50. Thus, the arm 72 has a usual range of travel as above set out.

Spade or spike 124 is mounted on one-half of hinge 126 which is attached to the forward bight 42 (FIGS. 2, 3, 4 and 7). The hinge 126 is above the forward bight 42 and on the forward side thereof so that if the spade 124 is in the ground, the vehicle 30 cannot move forward because the top of the spade 124 pushes against the forward bight 42. The spade 124 does not prevent the vehicle 30 from moving rearward inasmuch as the hinge 126 permits the spade to move away from the forward bight 42.

The trail tubes 32 are attached to the rear bight 44 (FIGS. 3, 4 and 8). Two ears 134 are welded to the rear bight 44. Therefore, the trail tube 32 may be attached into the third side of the pipe T 128. Stud 136 is threaded into the second side of the T 128 and nipple 138 into the first side. The stud and nipple extend through holes in the ears 134.

Flexible conduit 130 in the form of a rubber hose connects nipple 138 to the standards of sprinklers 24. The trail tubes 32 are made of aluminum tubing. The conduit 130 is attached by tape 140 to left side element 40.

The trail tubes 26 are connected to standards 141 of the sprinklers 24 by arms 132. The arms 132 extend from the top of standards 141 to a swivel so that the swivel is in line with the axles 48 of adjacent vehicles 30 (FIG. 5). This arrangement and the reasons therefor is more clearly set out in my co-pending applications noted above.

Figures 9, 10:
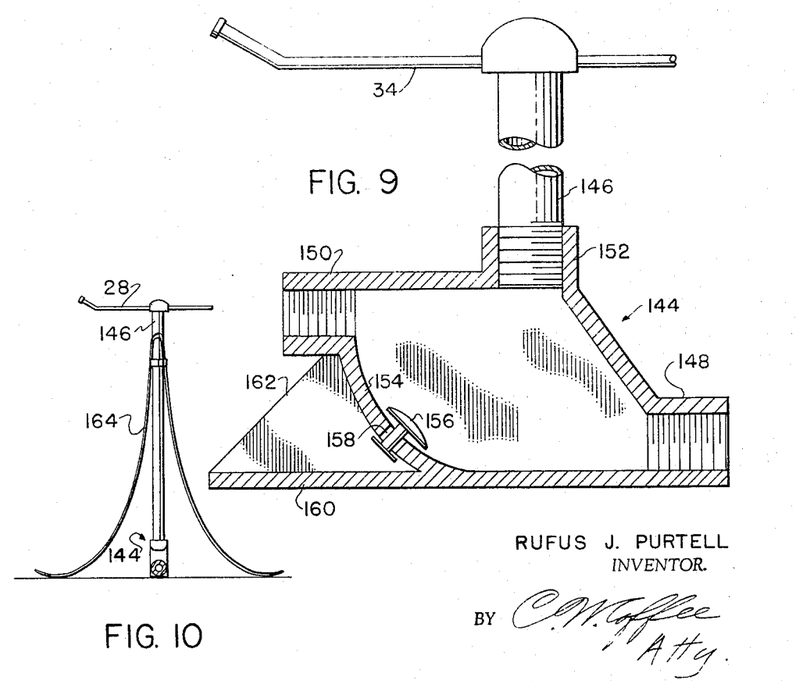
FIG. 9 is a cross section of one of the connections taken on line 9—9 of FIG. 1 with parts foreshortened.
FIG. 10 is a front elevational view of one of the connectors of the trail tubes taken on line 10—10 of FIG. 1.

Connectors 144 are used to connect the trail tubes 32 or 26 to standards 146 by which either sprinklers 34 or 28 are attached. (FIGS. 10 and 11.) The connectors have a generally rectangular body as seen in front elevation (FIG. 10). The inlet 148 is threaded and is close to the ground so that as the connector 144 is dragged along the ground, it does not tend to gather debris at the front of the connector. The connector is slightly larger in width than the diameter of the trail tube, but only slightly so. The trail tube threads directly into the inlet 148. At the rear of the connector 144, there is an outlet 150 to which an extension of the trail tube may be threaded to connect another connector 144 and sprinkler. If the connector is the last, the outlet is plugged. Threaded outlet 152 is in the top of the connector 144 and standard 146 is threaded directly into it. Along the rear wall of the connector is a curved sector 154. The radius of curvature of this is several times larger than the radius of curvature of the inlet opening 148 or either of the outlet openings 150 or 152. Therefore, automatic drain valve 156 may be inserted through hole 158 in the curved sector 154. Bottom runner 160 extends to the rear of the connector 144 flush with the bottom of the connector. Webs 162 extend from the body of the connector to the runner 160 on either side. The runner and the webs prevent debris from fouling the hole 158 or the operation of the drain valve 156.

Stiff wire 164 is bent into the shape illustrated in FIG. 10. The purpose of the wire 164 is to maintain the standards 146 erect as described in my prior patent issued February 13, 1962, Patent No. 3,087,680. The wire 164 extends from near the top of the standard 146 on either side of the standard. The wire 164 extends downwardly and outwardly. At the bottom, it is curved to lie flat along the ground. As described in the prior patent, it forms a means for maintaining the standard 146 erect, but will collapse to move through growing crops.

OPERATION

The operations are described from a beginning position with the pipe 22 supported by the ground between vehicles 30 and slightly above the ground at each vehicle 30. The line shaft 102 is rotated by means which will be understood by those in the art and is more explicitly described in my co-pending application as noted above. The sprocket 84 is rotated in such a direction as to cause the arms 72 to rotate in a counter clockwise direction as seen in FIG. 3. Rotation of the arms 72 in this direction is aided by the springs 78. At the beginning of rotation, the pipe 22 is resting on the forward portion 52 and the front wheel 60 will be on the ground and the spade 124 is driven into the ground. The lugs 112 of the chain 86 are engaged with the ground and the chain cannot move. Therefore, rotation of the sprocket 84 causes the arms 72 to move upward on the chain 86. As the arms 72 move upward, the spade 124 remains in the ground. The reaction of the movement of the sprocket 84 upon the chains 86 will maintain the spade 124 in the ground. However, when the weight of the arms 72 with the pipe 22 pass top dead center and the stop 120 strikes the rear portion 54, the inertia of the arms 72 with the pipe 22 will rock the vehicle 30 thus, raising the front portion 52 and lower the rear portion 54. This rocking removes the spade 124 from the ground, thus freeing the vehicle 30 to move forward. It will be seen that when the vehicle 30 is moving forward that it is being propelled by the lugs 112 upon the chain 86. Although the large wheel 50 contacts the ground between the lugs, the large wheel 50 is smooth and does not not offer traction upon the ground.

When the line of vehicles 30 has reached the desired location, the line shaft 102 is stopped and is rotated in the opposite direction. Inasmuch as the vehicles 30 cannot conveniently move rearward because of the trail tubes 32 attached to the vehicles 30, the arms 72 are rotated clockwise. When the arms 72 reach their lower position, the rotation of the line shaft 102 is stopped and the move completed.

Although it has not been specifically described, it will be understood to those skilled in the art that before the move is started that the lateral pipe 22 is disconnected from the main supply pipe 20 and upon completion of the move, that it is reconnected and the sprinklers started. Also, it will be understood to those skilled in the art that the water in the pipe 32 is drained therefrom by means of automatic drain valves 142 in pipe 22 (FIG. 5) and valves 156 in connectors 144 (FIG. 9), which are well known and commercially available on the market.

Should it be desired to move the vehicles 30 rearwardly, this may be accomplished by removing the trail tubes 32 and 26 and tying, or otherwise securing, the arms 72 in the elevated position. Therefore, when the line shaft 102 is rotated in the opposite direction, the arms 72 cannot rotate downward and there is nothing to prevent the vehicles 30 from moving rearward, so that the vehicles and the line of pipe 22 will move to the rear.

If it is desired to move the system parallel to the pipe 22, each of the front and rear wheels 60 and 64 moved downward and pinned into down position with the axles of the front and rear wheels transverse to the longitudinal pipe 22 (FIG. 2). The trail tubes are removed and then the system is moved in a longitudinal direction, being towed by a tractor (not shown).

It will be apparent that the embodiment shown is only exemplary and that various modifications can be made in construction, materials, and arrangement within the scope of the invention as defined in the appended claims.

What I claim as my invention in this patent is:

1. An irrigation pipe moving system comprising in combination:
    (a) an elongated pipe adapted to carry water under pressure, and
    (b) a plurality of vehicles attached to the pipe for moving same;
    (c) each of said vehicles including a frame,
    (d) a large wheel
    (e) mounted to the frame for rotation,
    (f) an arm mounted on the frame
    (g) for rotation about the same axis as said wheel,
    (h) means connected to the arm for causing relative movement between the arm and wheel,
    (i) said pipe attached to said arms, thus forming the attachment of said vehicles to the pipe,
    (j) a forward portion of the frame extending forward of the large wheel,
    (k) a forward wheel mounted on the forward portion,
    (m) a rear portion of the frame extending rearward of the large wheel,
    (n) a rear wheel mounted on the rear portion,
    (o) the attachment of the front and rear wheels such that only one touches the ground at a time, thus permitting the frame to rock about the large wheel, and
    (p) means on the forward portion of the frame for restraining the vehicle from moving forward when the front wheel is contacting the ground, said means on the forward portion for restraining the vehicle including
(q) a spade which digs into the ground when the front wheel is down and contacting the ground.

2. An irrigation pipe moving system comprising in combination:
(a) an elongated pipe adapted to carry water under pressure,
(b) a plurality of vehicles for moving the pipe,
(c) each vehicle having a frame,
(d) a large wheel mounted on the frame for rotation,
(e) an arm mounted on the frame for rotation coaxially with the wheel,
(f) said arm attached to said pipe,
(g) means interconnecting the arm and wheel for causing relative rotation between the arm and wheel,
(h) said frame extending in front and behind the wheel above the ground so that the frame may rock about the wheel,
(j) a spade attached to the frame in front of the wheel,
(k) said spade depending down so that if the front of the frame is rocked down, the spade prevents forward movement of the vehicle.

3. In an irrigation system having
(a) an elongated pipe adapted to carry water under pressure,
(b) a plurality of means for sprinkling water from the pipe onto the land to be watered, and
(c) a plurality of vehicles attached to the pipe for moving the pipe,
the improvement comprising in combination:
(d) each vehicle having a body,
(e) at least one ground engaging wheel on the body,
(f) a chain trained over the wheel,
(g) means for driving the chain,
(h) a plurality of lugs on the chain,
(j) said lugs being at least as wide as said wheel, and
(k) said chain being less than one-half the width of the wheel, and
(m) shoes attached to each of the lugs on either side of the chain,
(n) each of said shoes extending parallel to the chain,
(o) said shoes having the same radius of curvature of the wheel and therefore, preventing the lugs from bending the chain.

4. In an irrigation system including
(a) an elongated pipe adapted to carry water under pressure, and
(b) a plurality of vehicles for moving the pipe, each vehicle comprising in combination:
(c) a frame,
(d) a large wheel mounted on the frame for rotation about a horizontal axis,
(e) an arm mounted on the frame for rotation coaxially with said wheel,
(f) said arm attached to said pipe,
(g) means interconnecting the arm and wheel for causing relative rotation between the arm and wheel,
(h) a front vertical tube on the frame in front of the large wheel,
(j) a rear vertical tube on the frame behind the large wheel,
(k) a front fork in the front tube,
(m) a rear fork in the rear tube,
(n) a front wheel in the front fork,
(o) a rear wheel in the rear fork, and
(p) means interconnecting each fork and tube for locking each of the forks in a selected vertical and rotational position.

5. An irrigation pipe moving system comprising in combination:
(a) an elongated pipe adapted to carry water under pressure,
(b) a plurality of vehicles for moving the pipe,
(c) each of said vehicles including a frame,
(d) a large wheel
(e) mounted on the frame for rotation,
(f) an arm mounted on the frame,
(g) said pipe attached to each of said arms,
(h) each arm mounted for rotation about the same axis as said wheel,
(j) gearing means interconnecting the wheel and arm for causing relative rotation between the arm and wheel, and
(k) spring means for biasing the arm up so that relative rotation between the arm and wheel results in movement of the arm if the arm is within usual range of travel.

6. In an irrigation system including
(a) an elongated pipe adapted to carry water under pressure,
(b) a plurality of vehicles for moving the pipe,
(c) a shaft extending along the pipe and connected to each of the vehicles for powering each vehicle, each vehicle comprising in combination:
(d) a frame,
(e) a large wheel mounted on the frame for rotation about a horizontal axis,
(f) an arm mounted on the frame for rotation coaxially with said wheel,
(g) means interconnecting the arm and wheel for causing relative rotation between the arm and wheel, and
(h) a clutch attached to each arm,
(j) said shaft drivingly connected to said clutch, and
(k) said clutch drivingly connected to said means for causing relative rotation; so that the drive may be disconnected to each vehicle and said vehicle controlled individually.

7. An irrigation pipe moving system comprising in combination:
(a) an elongated pipe adapted to carry water under pressure,
(b) a plurality of vehicles for moving the pipe,
(c) a shaft extending along the pipe,
(d) each vehicle connected to the shaft,
(e) each of said vehicles including a frame,
(f) a large wheel mounted to the frame for rotation,
(g) a chain encircling the wheel,
(h) an arm mounted on the frame for rotation coaxially with said wheel,
(j) the arm connected to the pipe,
(k) a sprocket on the arm engaged with the chain,
(m) a clutch on the arm,
(n) said shaft drivingly connected to said clutch,
(o) said clutch drivingly connected to said sprocket,
(p) a spring means interconnecting the arm and frame for biasing the arm and thus the pipe to a raised position,
(q) a plurality of lugs on the chain,
(r) said lugs being at least as wide as said wheel,
(s) shoes attached to each of the lugs on either side of the chain,
(t) each of said shoes extending parallel to the chain,
(u) said shoes having the same radius of curvature of the wheel and therefore, preventing the lugs from bending the chain,
(v) said chain being less than one-half the width of the wheel,
(w) means attached to the arm for scraping mud from the periphery of the wheel,
(x) a forward portion of the frame extending forward of the wheel,
(y) a forward vertical tube attached to the forward portion,
(z) a forward fork telescoped within the forward vertical tube,
(aa) a forward wheel journalled in the forward fork,
(bb) means interconnecting the forward tube and fork for locking the forward fork in selected vertical and rotational positions, (cc) a rear portion of the frame extending behind the wheel,
(dd) a rear vertical tube attached to the rear portion,
(ee) a rear fork telescoped within the rear vertical tube,
(ff) a rear wheel journalled in the rear fork,
(gg) means interconecting the rear tube and fork for locking the rear fork in selected vertical and rotational positions,
(hh) the forward and rear wheels so mounted that if both are in a selected lowered vertical position the large wheel does not touch the ground and
(jj) if both the forward and rear wheels are in a selected raised position only one touches the ground with the large wheel,
(kk) a spade attached to the frame in front of the forward wheel,
(mm) said spade depending down so that if the forward position of the frame is down that the spade is in the ground but if the forward portion is raised that the spade is out of the ground,
(nn) a trail tube for each vehicle,
(oo) each trail tube adapted to be dragged behind a vehicle,
(pp) each trail tube having one end attached to the rear portion of a vehicle in towing arrangement so that movement of the vehicle tows the trail tube longitudinally, and
(qq) a flexible fluid conduit interconnecting the trail tube and pipe to supply water under pressure from the pipe to the trail tube.

References Cited by the Examiner

UNITED STATES PATENTS

| | | | |
|---|---|---|---|
| 1,743,530 | 1/1930 | Chapman | 280—158 |
| 2,465,567 | 3/1949 | Atwood | 180—70 |
| 2,726,895 | 12/1955 | Behlen | 239—212 |
| 2,796,292 | 6/1957 | Maggart | 239—213 |
| 2,892,466 | 6/1959 | Stilwell | 137—344 |
| 3,009,645 | 11/1961 | Nugent | 239—179 |
| 3,157,193 | 11/1964 | Purtell | 137—344 |
| 3,175,635 | 3/1965 | Bryan | 239—212 X |

FOREIGN PATENTS

| | | |
|---|---|---|
| 202,468 | 3/1956 | Australia. |
| 227,737 | 8/1959 | Australia. |

M. HENSON WOOD, JR., *Primary Examiner.*

EVERETT W. KIRBY, *Examiner.*

D. L. MOSELEY, V. C. WILKS, *Assistant Examiners.*